United States Patent [19]

Lewis et al.

[11] Patent Number: 5,705,878
[45] Date of Patent: Jan. 6, 1998

[54] FLAT SCANNING STAGE FOR SCANNED PROBE MICROSCOPY

[76] Inventors: Aaron Lewis, 38 Woodcrest Ave., Ithaca, N.Y. 14853; Klony Lieberman, 82-20 Beverly Rd., Kew Gardens, N.Y. 11415

[21] Appl. No.: 564,018

[22] Filed: Nov. 29, 1995

[51] Int. Cl.⁶ .................................................. H01L 41/08
[52] U.S. Cl. ........................ 310/328; 310/331; 310/369
[58] Field of Search ........................... 310/330–332, 310/328, 369, 366

[56] References Cited

U.S. PATENT DOCUMENTS

| 3,928,778 | 12/1975 | Ivanov et al. | 310/331 |
|---|---|---|---|
| 4,087,715 | 5/1978 | Myer | 310/328 X |
| 4,523,120 | 6/1985 | Assard et al. | 310/331 X |
| 4,525,852 | 7/1985 | Rosenberg | 310/328 X |
| 4,678,955 | 7/1987 | Toda | 310/328 |
| 4,686,440 | 8/1987 | Hatamura et al. | 310/331 X |
| 4,785,177 | 11/1988 | Besocke | 310/330 X |
| 4,917,462 | 4/1990 | Lewis et al. | 350/319 |
| 5,079,471 | 1/1992 | Nygren, Jr. | 310/328 |
| 5,173,605 | 12/1992 | Hayes et al. | 310/331 X |
| 5,252,884 | 10/1993 | Dona | 310/328 |
| 5,306,919 | 4/1994 | Elings et al. | 310/328 X |
| 5,323,082 | 6/1994 | Wright | 310/328 |
| 5,332,942 | 7/1994 | Rennex | 310/328 |
| 5,508,838 | 4/1996 | Shimizu et al. | 310/331 X |

OTHER PUBLICATIONS

"Near–field Optical Imaging with a Non–Evanescently Excited High–Brightness Light Source of Sub–Wavelength Dimensions," Letters of Nature, vol. 354, 21 Nov. 1991.
"An Easily Operable Scanning Tunneling Microscope," K. Besocke, Surface Science 181 (1987) pp. 145–153, 30 Jul. 1986.

Primary Examiner—Mark O. Budd
Attorney, Agent, or Firm—Jones, Tullar & Cooper, P.C.

[57] ABSTRACT

A three-dimensional scanner incorporates a flat stage for receiving samples. The stage is supported in a scanning frame by four identical quadrant tube piezo-electric scanner elements. Each element is fixed at one end to a fixed chassis and is fastened at its opposite end through a connector to the scanner frame. The scanner elements are operated in pairs to move the stage in an X-Y plane, and are operated together to move the stage in a Z direction perpendicular to the X-Y plane.

15 Claims, 2 Drawing Sheets

FLAT SCANNING STAGE FOR SCANNED PROBE MICROSCOPY

FIELD OF THE INVENTION

A novel piezo-electric scanner design incorporates X, Y and Z scanning into a flat stage less than 7 mm high. Scan ranges of greater than 30 microns along with axial positioning capabilities of 30 microns can be obtained with this device. The scanning stage also provides for inertial translation of a sample over many millimeters. The flat design is particularly well suited for near-field scanning optical microscopy and for working in conjunction with other optical microscopy techniques such as confocal optical microscopy.

BACKGROUND OF THE INVENTION

The scanning stage lies at the heart of all scanned probe microscopes (SPM) (D. Sarid, *Scanning Force Microscopy*, Oxford University Press, New York). The precise movements needed for SPM instruments to either move a sample or a specialized tip that acts as the imaging element, require Angstrom accuracy over many microns and dictate the use of piezo-electric materials. These materials expand or contract when an electric field is applied across them and are commonly used for fine positioning of small components.

With known piezo-electric materials a variety of scanning technologies have been developed, but in all the techniques that are described below it has been particularly problematic to place a high power microscope objective directly below or above a sample for both viewing the sample and, in the case of the investigation of optical emissions or absorptions, to collect light from the tip/sample interaction region.

STATE OF PRIOR ART

The first scanning tunneling microscope (STM) relied on three separate orthogonal piezo-electric positioners for the X, Y and Z translation (D. Sarid, *Scanning Force Microscopy*, Oxford University Press, New York). This was rapidly succeeded by the single tube scanner developed by Binning and Smith (D. Sarid, *Scanning Force Microscopy*, Oxford University Press, New York) which provided X-Y scanning and Z positioning with a single element. This element consists of a single piezo-electric tube in which the outer electrode is segmented into four equal quadrants as is shown in FIG. 1. A positive voltage applied to one quadrant results in an expansion of the tube length on one side while a negative voltage of equal magnitude applied to the opposite quadrant causes a contraction of the corresponding quadrant, with the net result being a bending of the tube. This bending is significantly greater than the axial expansion of the tube. This tube scanner has remained, in one form or another, in all scanned probe microscopes. Short tubes can scan over several microns while larger tubes can provide scan ranges of up to 75–100 microns.

A further advance was the introduction of the tripod scanner by Besocke (K. Besocke, Surface Science 181, 145 (1987)). In this design three identical quadranted tubular scanners are used in unison and the sample rests on top of the tubes. This allows one to scan a sample in the ordinary fashion and has the added feature of allowing one to roughly position the sample over a very large range by an inertial translation technique. This inertial translation is accomplished by slowly bending the three tubes to one side and then rapidly straightening them back to their initial position in a single jerk. Due to inertia, the sample remains in place as the tubes are jerked back and the net result is a lateral translation of the sample. The translation can be in either the X or Y direction and is limited only by the extent of the sample itself. The actual bending of the tubes is accomplished simply by using a sawtooth voltage on the piezos. In addition to translation, coarse axial positioning is also achievable by placing the sample on an appropriate mount and using inertial rotation.

The greatest drawback of these single and triple tube designs is the large axial extension of the scanner. The long range scanning tubes used in today's commercial STM and AFM systems can extend for several inches (D. Sarid, *Scanning Force Microscopy*, Oxford University Press, New York). This restriction has meant that all the inspection optics is placed on one side of the sample, with the region on the other side being the sole domain of the scan mechanism. This has been particularly problematic in near-field scanning optical microscopy ("Near-Field Scanning Optical Microscopy", U.S. Pat. No. 4,917,462, Issued Apr. 17, 1990) where one desires to place a high power microscope objective directly below or above a sample for both viewing the specimen and collecting the near-field optical emissions. In order to get around this problem a number of ingenious solutions had to be devised. One option was to scan the tip rather than the sample (A. Lewis and K. Lieberman, Nature 354, 214 (1991). This can result in image artifacts and destroys the axial symmetry of the optical system and is undesirable. Other options include placing the objective completely inside a single large diameter tube or in the center of a tripod scanner. Both of these methods make changing objectives difficult or impossible. A final possibility is to cantilever the sample of the edge of a tube scanner placed beside the objective; however, this can cause severe mechanical instability problems.

SUMMARY OF THE INVENTION

The device described herein provides an ideal solution to the foregoing problems by providing scanning in three orthogonal directions in a thin, flat package that can be as small as a few millimeters high. The present device is also ideally suited for stage scanning confocal optical microscopy. Its inherent axial positioning capability provides a mechanism for optically slicing a sample in the Z direction while scanning it through the confocal spot.

Thus, the present invention is a method and a device for three-dimensional, long-range scanning in a flat structure that can be as small as several millimeters high.

BRIEF DESCRIPTION OF DRAWINGS

The foregoing, and additional objects, features, and advantages of the present invention will be apparent from the following detailed description of a preferred embodiment, taken in conjunction with the accompanying drawings, in which.

DESCRIPTION OF PREFERRED EMBODIMENT

Figure 1:
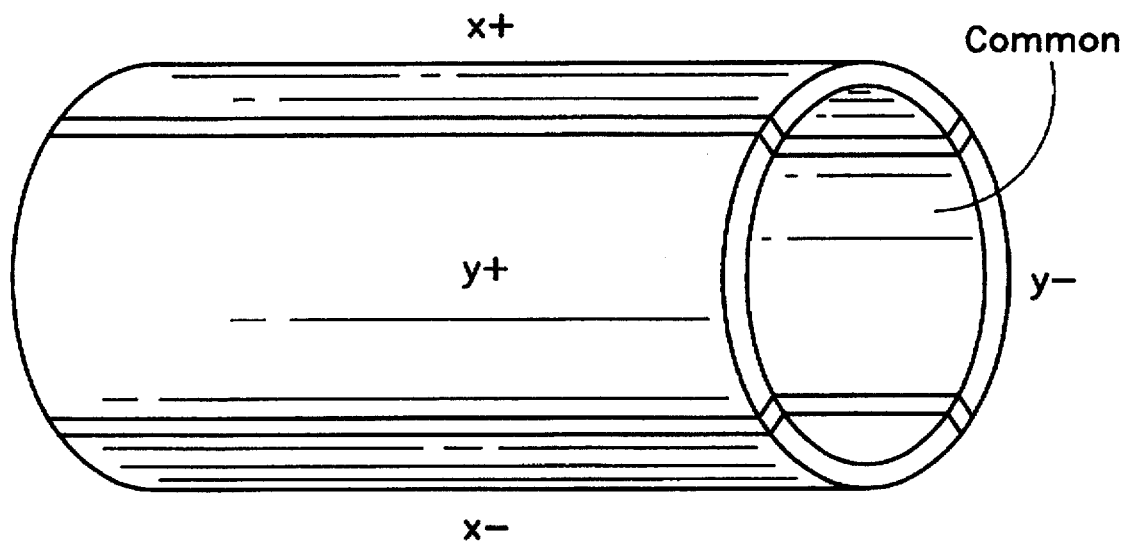
FIG. 1 discloses a single tube piezo-electric scanner.
Figure 2:
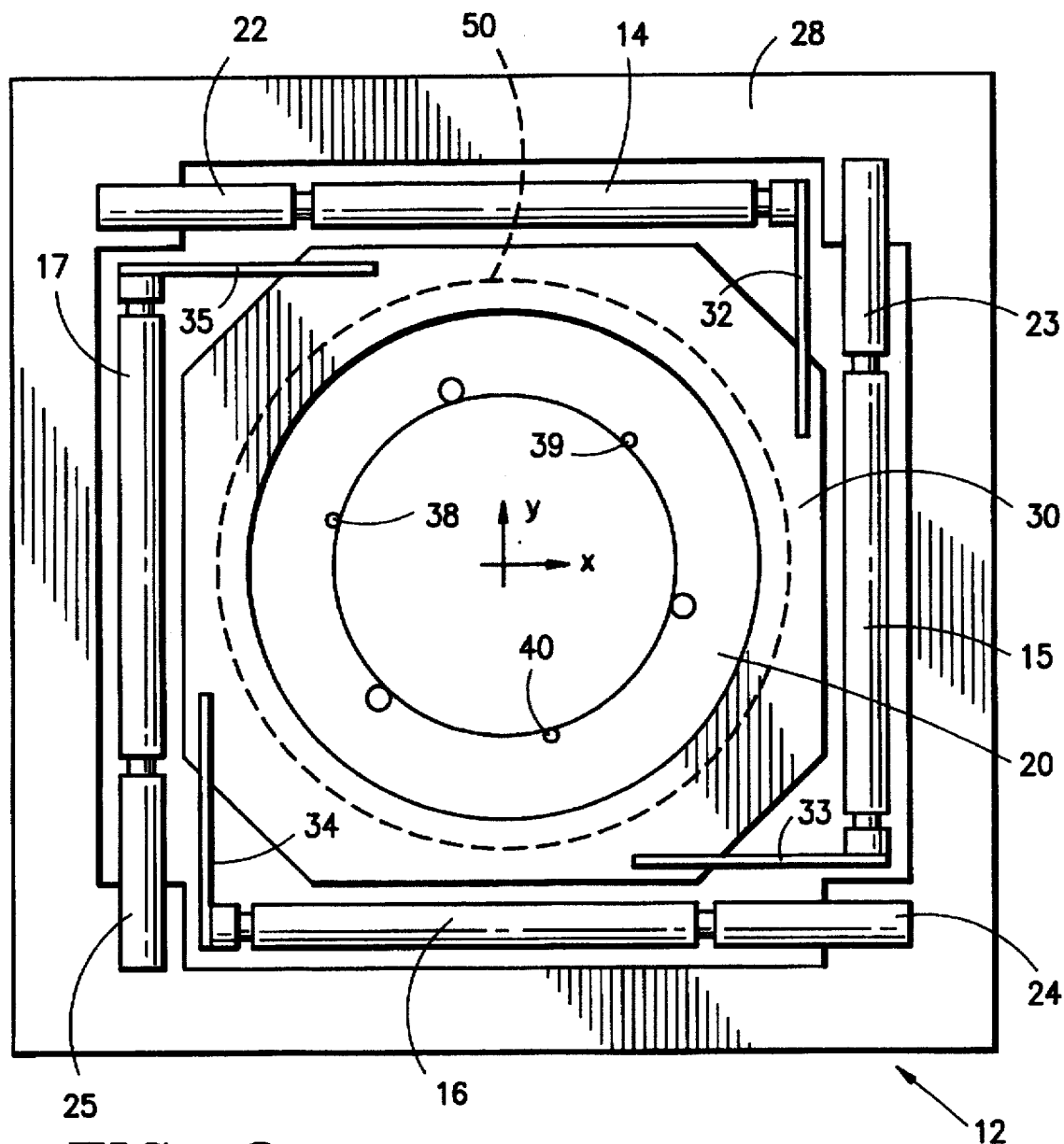
FIG. 2 is a diagrammatic top plan view of a flat stage piezo-electric scanner in accordance with the invention.
Figure 3:
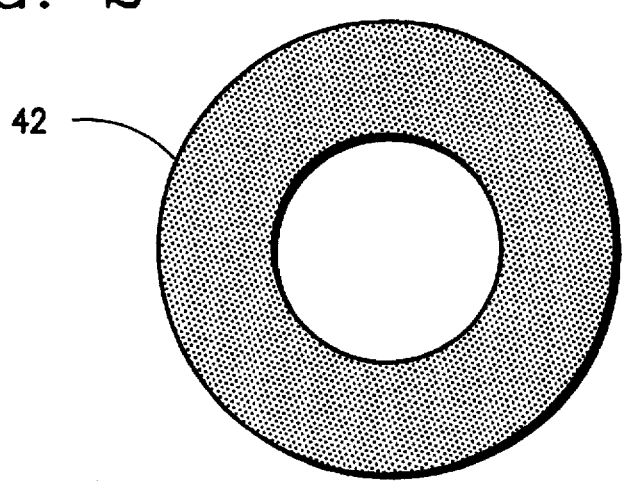
FIG. 3 is an enlarged view of a sample positioning agent used in the scanner of FIG. 2.

In accordance with the present invention, the solution to the problems of conventional piezo-electric scanners outlined above, is to use the capabilities of the piezo tube scanners 10, shown in FIG. 1, in a flat geometry. The flat scanner of the invention is depicted schematically at 12 in FIG. 2. Four identical quadrant scanners 14, 15, 16 and 17 are used to support a sample at a central stage, or sample mount 20 and provide the scanning. Each of the tubes 14-17 is fixed at one end by a corresponding rigid connector 22-25, respectively, to a chassis 28 and is attached at the other end to a scanning frame 30 via four thin, flat, flexible, connectors 32-35, respectively. These connectors are rigid when forces are applied in the two directions (X,Y) that make up the plane of the connector but flex readily in the direction (Z) normal to their top surfaces. Three small spheres 38-40 are embedded in the top surface of scanning frame 30 and provide a base for the sample mount 20 that is placed on top of the small spheres. An optional addition is three small magnets 42 that are placed on the scanning frame in order to hold the sample mount in place.

Figure 4:
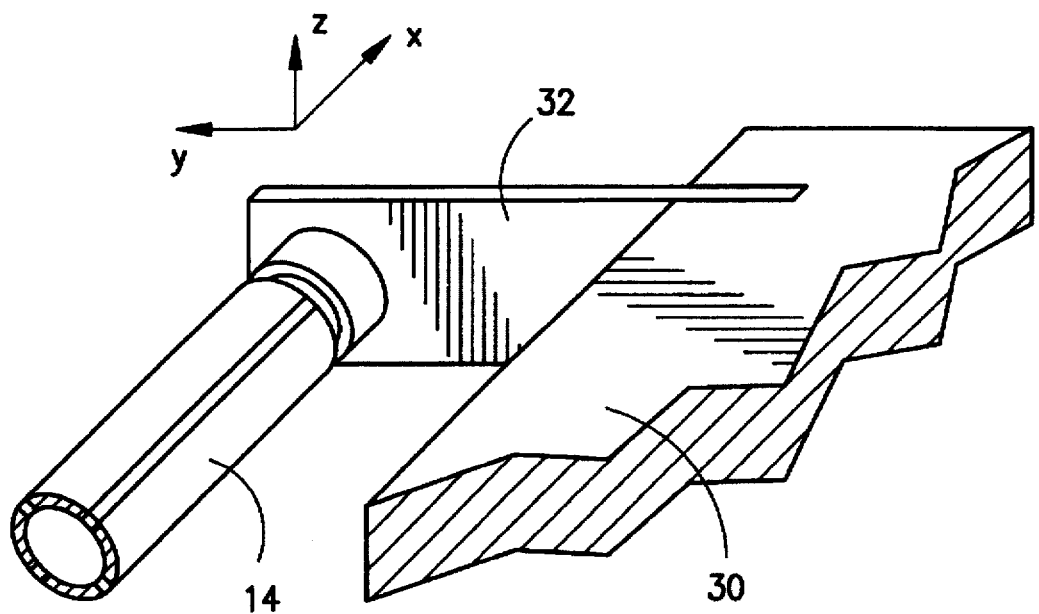
FIG. 4 is an enlarged diagrammatic perspective view of a flexible joint connector used in the scanner of FIG. 2 between a piezo-electric tube and a sample frame.

An important component in the above scanner are the flexible connectors 32-35 that attach the piezo-electric tube scanners 14-17 to the scanning frame 30. One of these connectors is enlarged in FIG. 4 with the same part numbers as was described in FIG. 2.

Lateral (X-Y) scanning of frame 30 is performed by using the piezo tubes in pairs while axial positioning in a direction (Z) perpendicular to the X,Y plane is provided by using all four tubes simultaneously. For example, to move the sample frame to the left (negative X direction—refer to FIG. 2), tubes 15 and 17 are bent to the left by applying appropriate voltages to the left and right outer electrodes of the tubes (see FIG. 1). The bending of the tubes results in pushing and pulling on their respective connectors 33 and 35 and applying a force to the sample frame. Connectors 32 and 34 are perpendicular to the direction of the applied force and simply flex, allowing the sample frame to move to the left. Translation to the right (+X) is obtained by reversing the voltages on the tubes. Translation in the Y direction can be accomplished independently by applying voltages to tubes 14 and 16 and flexing connectors 33 and 35.

Axial (Z direction) translation of the sample frame 30 is accomplished by applying voltages to the upper and lower electrodes of all four tubes simultaneously. The axial translation range is equal to the lateral range and fully independent of it.

The actual scan range of the device depends on the intrinsic properties of the piezo-electric tubes, the dimensions of the tubes and the voltages applied. There are eight electrical connections to the device consisting of: +X, −X, +Y, −Y, +Z, −Z, piezo ground (center of the piezo tube) and the chassis ground. With typical scan voltages of +/−125 volts and commercially available 0.125" diameter tubes 1.25" long, XYZ scanning with ranges of 35μ can be achieved.

Inertial translation of the sample is performed exactly as in the tripod scanner described above. The sample 20 rests on three spheres 38, 39 and 40 embedded in the central frame. Small magnets 42 can be included if desired to increase the coupling between the sample and the frame and to allow inverted operation. To move the sample, the scanning frame 30 is moved in the desired direction and then jerked back to the neutral position fast enough so that the sample's inertia keeps it in position, resulting in a net displacement of the sample.

The principle advantage of the present scanner over previous geometries is that the three-dimensional scanning is accomplished in a flat thin plate which can be readily placed close to a high power microscope objective. Since the scanner does not extend below the plane of the plate, the objective is completely free to be exchanged by the simple rotation mechanisms found in all optical microscopes. In addition, unlike any previous configuration of three-dimensional scanners using tube piezos, in which the axial motion is limited to a fraction of the lateral range, in the present design the axial motion is fully equal to the lateral motion. This greatly simplifies approach mechanisms, since the tip can easily be placed with conventional optics, close enough to a surface so that the axial, or Z scan, mechanism can readily bring the tip into contact with the surface.

The present scanning technique is, of course, of considerable use in its own right for all scanning applications. Specifically, however, scanned probe microscopies stand to benefit by introducing this scanning mechanism into the instruments. In all these microscopies it has always been difficult to view the tip and the sample together, but this limitation is eliminated with the present design. For such microscopes a second plate 50 (shown in phantom) holding a probe and its associated mechanics, optics and electronics would be placed on the scanning stage 30 to provide an integrated scanned probe microscope system that is fully compatible with all types of conventional optical microscopie including confocal scanning optical microscopy. Of the scanned probe microscopies, near-field optical microscopy stands to gain the most from this design. With such an optical technique it is absolutely crucial for both viewing and collection of the light to fully integrate the fine three-dimensional scanner into a conventional optical microscope. This allows for overlapping fields of view between the conventional optical microscope and the super-resolution near-field optical techniques. The scanner will also be useful for confocal microscopies where presently complex mechanisms of lens scanning are used to change the focal plane of the lens in order to get optical sectioning.

Although the invention has been described in terms of a preferred embodiment, it will be apparent to those skilled in the art that modifications may be made without departing from the true spirit and scope of the invention as set out in the following claims.

What is claimed is:

1. A scanning stage, comprising:
    a chassis;
    a scanning frame;
    four quadranted cylindrical piezoelectric elements coplanar with said frame connected to support said scanning frame on said chassis, said elements being spaced around said frame with each element being perpendicular to its next adjacent elements, each said element having a first end and a second end, the first end of each element being fixedly connected to said chassis; and
    connecting joints connected between the second end of each element and said scanning frame whereby bending of said elements produces orthogonal scanning of said scanning frame with respect to said chassis.

2. The scanning stage of claim 1, further including a sample mount supported on said scanning frame.

3. The scanning stage of claim 1 wherein said four quadrantal cylindrical elements comprise a first pair of elements parallel to each other and a second pair of elements parallel to each other but perpendicular to said first pair of elements.

4. The scanning stage of claim 3, wherein said first pair of elements is bendable in the plane of said frame to move said scanning frame along an X axis and said second pair of elements is bendable in the plane of said frame to move said scanning frame along a Y axis.

5. The scanning stage of claim 4, wherein said first and second pairs of elements are bendable in a direction perpendicular to said frame to move said scanning frame along a Z axis, and wherein said X, Y and Z axes are mutually perpendicular.

6. The scanning stage of claim 5, wherein each said connecting joint comprises a thin, flat elongated connector bar which is axially rigid, which is connected at a first end to a corresponding piezoelectric element, and which is connected at a second end to said scanning frame.

7. The scanning stage of claim 6, wherein each said connector bar is perpendicular to its corresponding piezoelectric element to move said scanning frame in the direction in which its corresponding piezoelectric element bends.

8. The scanning stage of claim 7, wherein said connector bars connected to said second pair of elements are flexible to permit motion of said scanning frame in said X direction and wherein said connector bars connected to said first pair of elements are flexible to permit motion of said scanning frame in said Y direction.

9. The scanning stage of claim 1, wherein said connecting joints comprise connector bars which are axially rigid and laterally flexible in the plane of said frame.

10. The scanning stage of claim 9, further including means for slidably supporting a sample mount on said frame.

11. The scanning stage of claim 1, wherein said quadranted cylindrical piezoelectric elements are secured on said chassis for selective bending motion in the plane of said frame and in directions perpendicular to the plane of said frame.

12. The scanning stage of claim 1, wherein said scanning frame and piezoelectric elements have a thickness of several millimeters in a direction perpendicular to the plane of said scanning frame.

13. The scanning stage of claim 1, wherein said elements are bendable to move said frame orthogonally over a scanning range of 100 microns.

14. The scanning stage of claim 1 including a sample mount and a mounting plate on said frame for receiving a scanned probe microscope.

15. The scanning stage of claim 1, wherein said elements are bendable to move said stage in micron steps in a confocal scanning optical microscope, wherein said orthogonal motion of said frame provides Z direction motion for optical sectioning and XY direction motion for stage scanning.

* * * * *